(12) United States Patent
Frieder, Jr.

(10) Patent No.: US 6,752,893 B2
(45) Date of Patent: Jun. 22, 2004

(54) RIMLESS SPECTACLES AND METHOD FOR MAKING THE SAME

(75) Inventor: Leonard P. Frieder, Jr., Dalton, PA (US)

(73) Assignee: Gentex Corporation, Carbondale, PA (US)

( * ) Notice: Subject to any disclaimer, the term of this patent is extended or adjusted under 35 U.S.C. 154(b) by 138 days.

(21) Appl. No.: 09/966,951

(22) Filed: Sep. 28, 2001

(65) Prior Publication Data

US 2003/0062117 A1 Apr. 3, 2003

(51) Int. Cl.$^7$ ................................................ G02C 1/02
(52) U.S. Cl. .................... 156/272.2; 351/110; 351/121; 351/178
(58) Field of Search ....................... 156/272.2; 351/110, 351/121, 133, 140, 144, 178

(56) References Cited

U.S. PATENT DOCUMENTS

| | | | |
|---|---|---|---|
| 2,004,005 A | | 6/1935 | McDanal |
| 3,424,890 A | | 1/1969 | Van Ruyven |
| 3,705,043 A | | 12/1972 | Zabiak |
| 3,824,006 A | * | 7/1974 | Voit ........................... 351/106 |
| 4,069,080 A | | 1/1978 | Osborne |
| 4,156,626 A | | 5/1979 | Souder |
| 4,424,435 A | | 1/1984 | Barnes, Jr. |
| 4,606,859 A | | 8/1986 | Duggan et al. |
| 4,657,345 A | | 4/1987 | Gordon |
| 4,692,001 A | * | 9/1987 | Anger ......................... 351/41 |

(List continued on next page.)

FOREIGN PATENT DOCUMENTS

| | | |
|---|---|---|
| DE | 162922 | 6/1966 |
| DE | 3239699 | 5/1984 |
| DE | 4432081 | 3/1996 |
| EP | 0126787 | 12/1984 |
| EP | 0 159 169 | 10/1985 |
| EP | 0 282 181 | 9/1988 |
| EP | 0 483 569 | 5/1992 |
| FR | 2624278 | 6/1989 |
| FR | 2719674 | 11/1995 |
| FR | 2749088 | 11/1997 |
| FR | 2793040 | 11/2000 |
| JP | 62142092 | 6/1987 |
| JP | 6298828 | 10/1994 |
| JP | 8230043 | 9/1996 |
| JP | 9220785 | 8/1997 |
| WO | PCT/DK87/00008 | 1/1987 |
| WO | WO 98/02294 | 1/1998 |
| WO | WO 00/20157 | 4/2000 |
| WO | WO 01/07524 | 2/2001 |

OTHER PUBLICATIONS

By Jones IA and Hilton PA, Sallavanti, R. , Griffiths J., "Use of Infrared Dyes for Transmission Laser Welding of Plastics", ICALEO Conference, Nov. 1999.

Avecia Infra Red Dyes Product Description; http://www.avecia.com/infrared/products.htm, Apr. 27, 2001.

U.A. Russek; Laser Beam Welding of Polymers with High Power Diode Lasers Joining Innovation for Micro and Macro Technologies; Fraunhofer–Institit fur Lasertechnik ILT; Steinbachstr, Germany 2000.

*Primary Examiner*—Jeff H. Aftergut
*Assistant Examiner*—John T. Haran
(74) *Attorney, Agent, or Firm*—Keusey, Tutunjian & Bitetto, P.C.

(57) ABSTRACT

The method for manufacturing rimless spectacles provides a connection region between the lens and the rimless supporting structure wherein the connection region includes a radiation absorbing dye having a predetermined wavelength absorbing band. The lens and rimless supporting structures are then joined together, and the radiation absorbing dye is irradiated by a source of radiation operating at a wavelength within the predetermined wavelength band. Once exposed, the lens and rimless supporting structure are fused together.

20 Claims, 3 Drawing Sheets

U.S. PATENT DOCUMENTS

| | | | |
|---|---|---|---|
| 4,879,450 A | 11/1989 | Valentin et al. | |
| 4,892,584 A | 1/1990 | Chapman | |
| 4,906,320 A | 3/1990 | Powers | |
| 4,969,969 A | 11/1990 | Powers | |
| 5,005,926 A | 4/1991 | Spielberger | |
| 5,093,147 A | 3/1992 | Andrus et al. | |
| 5,113,479 A | 5/1992 | Anderson et al. | |
| 5,252,262 A | 10/1993 | Patel | |
| 5,279,693 A | 1/1994 | Robinson et al. | |
| 5,501,759 A | 3/1996 | Forman | |
| 5,646,706 A * | 7/1997 | Izumitani | 351/110 |
| 5,833,743 A | 11/1998 | Elwakil | |
| 5,837,042 A | 11/1998 | Lent et al. | |
| 5,843,265 A | 12/1998 | Grimm | |
| 5,893,959 A | 4/1999 | Muellich | |
| 5,897,694 A | 4/1999 | Woolf | |
| 5,990,197 A | 11/1999 | Escano et al. | |
| 6,010,564 A | 1/2000 | Zhu et al. | |
| 6,024,444 A | 2/2000 | Little | |
| 6,077,377 A | 6/2000 | Bentz et al. | |
| 6,099,625 A | 8/2000 | Bradbury et al. | |
| 6,117,613 A | 9/2000 | Kawauchi et al. | |
| 6,136,079 A | 10/2000 | Evans et al. | |
| 6,149,719 A | 11/2000 | Houle | |
| 6,174,356 B1 | 1/2001 | Evans et al. | |
| 6,183,549 B1 | 2/2001 | Wight | |
| 6,199,981 B1 * | 3/2001 | Chao | 351/110 |
| 6,220,673 B1 | 4/2001 | Russell et al. | |
| 6,248,161 B1 | 6/2001 | Nguyen et al. | |
| 6,329,635 B1 | 12/2001 | Leong et al. | |

* cited by examiner

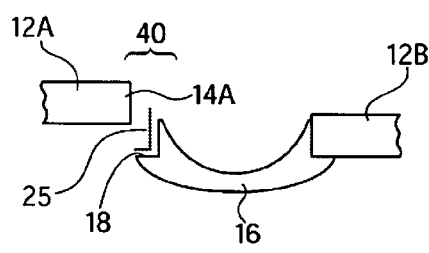
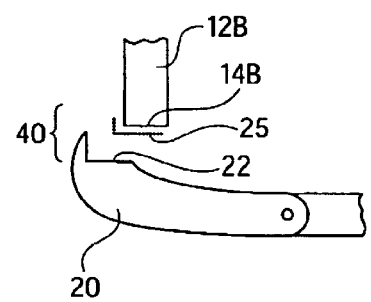
FIG. 4A  FIG. 4B
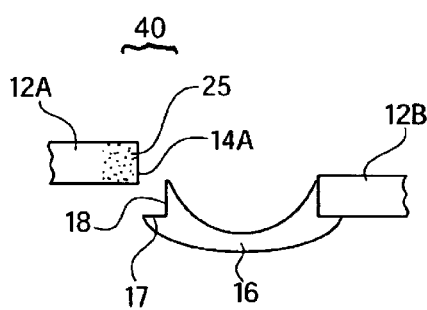
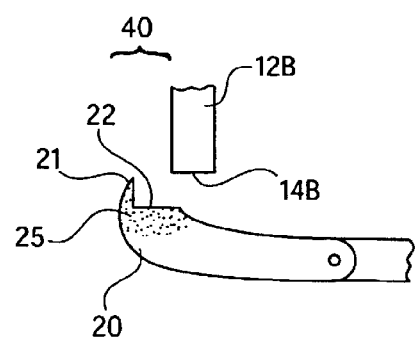
FIG. 5A  FIG. 5B

RIMLESS SPECTACLES AND METHOD FOR MAKING THE SAME

BACKGROUND OF THE INVENTION

1. Field of the Invention

The present invention relates to rimless spectacles. More particularly, it relates to rimless spectacles and a method of manufacturing the same using laser welding techniques.

2. Description of the Prior Art

There has been an ongoing trend in the eyeglass industry to reduce and ideally eliminate the means for retaining the eyeglass lenses on the wearer's face. Originally, and still today, eyeglasses are manufactured using complete frames. These frames would encompass the entire circumferential edge of the lens and thereby enable the connection of temple arms and a bridge to the lens frame structure.

After the original eyeglass frames, other versions such as partial frame or wire frame assemblies were introduced. The wire frame embodiment was such that the lenses are circumferentially entirely encompassed by very thin, small wires that attach to the temple arm portions. The wire frames provide an aesthetically pleasing appearance by substantially eliminating the visible frame from the eyeglass construction, and allowing the lens itself to define the shape of the eyeglasses. It is this aesthetic appearance that has brought on the most recent trend of rimless spectacles. In any of the above cases, the lenses must be edged before they can be inserted into hard or wire frames. This edging is required in order to facilitate the fabrication of the glasses.

Rimless spectacles are directed at providing the least amount of hardware between the bridge, temple arms and the lenses. An example of rimless spectacles can be seen in U.S. Pat. No. 2,004,005. As shown and described, rimless spectacles require the drilling of holes through the lenses for the purpose of mounting the bridge and temple arms with screws or other hardware.

International Patent Application No. PCT/DK87/00008 discloses a Lens Holding Means for Glasses, particularly for Rimless Glasses. The bridge and temple arms are fastened to the lenses by means of holding portions that are received in holes or recesses in the lenses themselves.

The manufacturing of rimless spectacles is time and labor intensive, as it requires the precise drilling of holes through the lenses and subsequent mounting of the temple arms and bridge to physically construct the rimless spectacles. This labor intensive process is performed after the lenses have been cut for the wearer's prescription and to the preferred shaped.

It is therefore desirable to provide a rimless spectacle that eliminates the need for drilling holes in the lenses and which can be manufactured without requiring labor intensive processes.

SUMMARY OF THE INVENTION

It is therefore an object of the present invention to provide a rimless spectacles that overcomes the shortfalls of the prior art and eliminates the need for additional hardware to mount the rimless supporting structures of the bridge and temple arms.

It is another object of the invention to provide a method for manufacturing rimless spectacles that eliminates the need for drilling holes in the lenses to mount the supporting structures of the bridge and temple arms.

It is yet another object of the invention to provide a method for manufacturing rimless spectacles that uses laser welding and specialized laser wavelength absorbing materials to attach the temple arms and bridge to the respective lenses.

These and other objects are achieved in accordance with an embodiment of the invention wherein the method for manufacturing rimless spectacles includes the steps of providing a connection region between the lens and the rimless supporting structure wherein the connection region includes a radiation absorbing dye having a predetermined wavelength absorbing band, and exposing the radiation absorbing dye to a source of radiation operating at a wavelength within the predetermined wavelength band of the radiation absorbing dye.

According to another embodiment of the invention, the method of manufacturing rimless spectacles includes the steps of providing a connection region between an edge of the lens and the rimless supporting structure where the connection region includes a radiation absorbing dye having a predetermined wavelength absorbing band, and exposing the radiation absorbing dye to a source of radiation operating at a wavelength within the predetermined wavelength absorbing band.

In accordance with various embodiments of the invention, the radiation absorbing dye may be disposed in the connection region by applying the same to an external surface of the lens and/or the rimless structure at the point of contact between the two parts. The radiation dye may also be incorporated into the lens and/or the rimless supporting structures during the manufacturing of the same.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numeral denote similar components throughout the views:

FIG. 4a is a schematic representation of the method of manufacturing the rimless spectacles according to a first embodiment of the invention FIG. 4b is a schematic representation of the method of manufacturing the rimless spectacles according to a second embodiment of the invention;

FIG. 5a is a schematic representation of the method of manufacturing the rimless spectacles according to a third embodiment of the invention;

FIG. 5b is a schematic representation of the method of manufacturing the rimless spectacles according to a fourth embodiment of the invention;

DETAILED DESCRIPTION OF PREFERRED EMBODIMENTS

Figure 1:
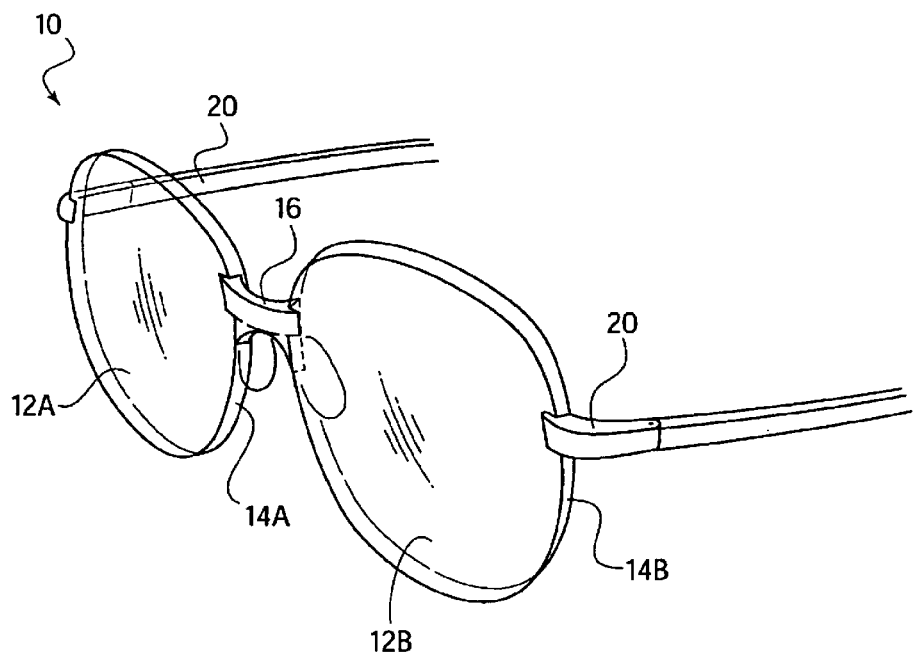
FIG. 1 is perspective view of the rimless spectacles according to an embodiment of the invention.
Figure 2:
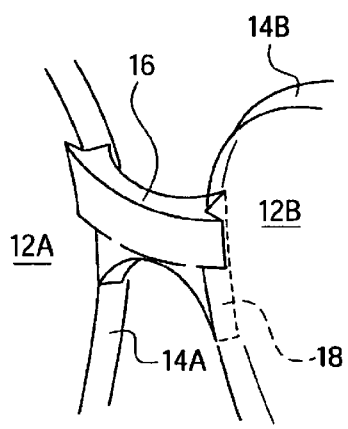
FIG. 2 is an enlarged perspective view of the rimless spectacle bridge according to an embodiment of the invention.
Figure 3:
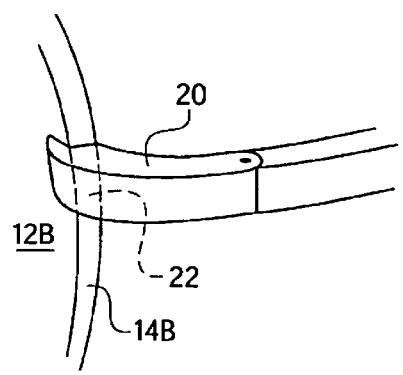
FIG. 3 is an enlarged perspective view of the rimless spectacle temple arm according to an embodiment of the invention.

Referring to FIGS. 1–3, there is shown the rimless spectacles 10 according to an embodiment of the invention. Rimless spectacles 10 include lenses 12a and 12b that are plastic and preferably one of polycarbonate, CR-39 lenses or castable thermosetting optical resins (e.g., cast acrylic). The materials usable by the present invention are those materials that include as a primary characteristic the ability to be laser welded. The lenses 12a and 12b each have respective edges 14a and 14b that are in contact with the rimless support structures. In this application, the phrase "rimless support structures" refers to either the bridge 16, the temple arms 20, or both.

In accordance with the present invention, the bridge 16 and temple arms 20 are connected to the edges 14a and 14b of the respective lenses without the use of hardware or requiring drilling into the lens to support such hardware. The bridge 16 includes opposing surfaces 18a (not shown) and 18b that physically contact the edges 14a and 14b of the lenses 12a and 12b, respectively. The temple arm 20 includes a surface 22 that contacts the edges 14a and 14b of the lenses.

Referring to FIGS. 4a and 4b, a contact region 40 is formed between the bridge 16 and temple arms 20 and the respective lens edges 14a and 14b when they are brought together during manufacturing. A radiation absorbing dye 25, having a known predetermined wavelength absorbing band, is disposed within the connection region 40 between the rimless supporting structures 16, 20 and the respective edges 14a and 14b of the lenses.

When the lens edges 14a and 14b are brought into contact with the respective rimless support structure 16, 20, the radiation absorbing dye 25 is exposed to source of radiation operating at a wavelength within the known wavelength absorbing band. This exposure causes the dye 25 to decompose entirely in an exothermic reaction, that when complete, not only results in the fusing of the lens with the rimless support structure, but also results in the complete disappearance of the dye 25 when viewed by the visible eye. Those of skill in the art will recognize that the exposure to the radiation source will take place through the lens 12 or rimless support structures 16, 20 depending on which part contains the dye 25, and the transmissiveness of the part through which the radiation must pass to irradiate the dye.

According to this embodiment, the radiation absorbing dye 25 may be applied to one of the lens edge surfaces 14a, 14b or the surfaces 18 and 22 of the bridge 16, and temple arms 20, respectively.

Due to the prescriptive and ultra cosmetic nature of rimless spectacles, it is required that the radiation absorbing dye 25 have a significantly higher decomposition efficiency than other known dyes, such as, for example, carbon black. This requirement for higher efficiency is due, in part, to the potential for interference with the optics of the prescriptive lenses. The increased efficiency of the radiation absorbing dye lowers the required concentration level, and thereby reduces the amount of radiation absorbing dye required to fuse the parts together as disclosed herein. The lower concentration makes the dye virtually invisible upon initial application. Even if the dye is slightly visible as may occur with a narrow band visible light absorbing species, a small concentration of dye will readily decompose during welding rendering the dye virtually invisible anyway. Typically, the dyes convert visible, near infrared or infrared radiation into localized heat via vibrational relaxation, after which the dye molecule decomposes into inert, invisible by-products.

FIGS. 5a and 5b show another embodiment where the radiation absorbing dye 25 is incorporated into one of the lens 12, the rimless supporting structures 16, 20, or both. Thus, the lens edge 14 or rimless supporting structures 16, 20 that are within connection region 40 automatically contain the radiation absorbing dye 25 required for the fusing of the two parts together. It is understood that the radiation absorbing dye 25 will not be visible to the naked eye when incorporated into the respective parts. In this embodiment, the exposure from the radiation source must take place through the part that does not contain the radiation absorbing dye 25.

Figure 6A:
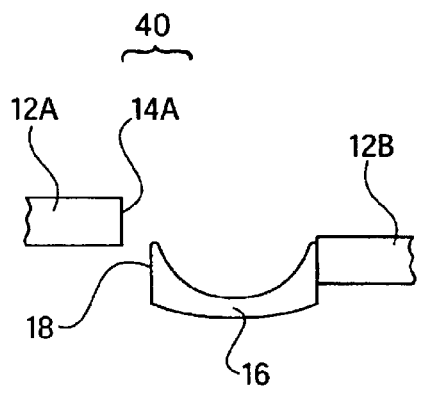
FIGS. 6a and 6b are schematic representations of the method of manufacturing the rimless spectacles according to another embodiment of the invention.
Figure 6B:
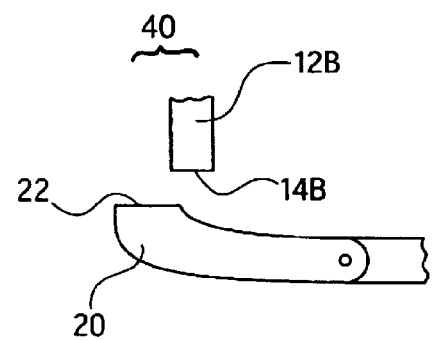

FIGS. 6a and 6b show another embodiment where the rimless support structures 16 and 20 are designed such that the respective surfaces 18 and 22 engage only the lens edge 14a and 14b, respectively. As shown in the embodiments of FIGS. 4a–5b, the bridge 16 includes portions 17 that go beyond the lens edge and onto the lens surface, while the temple arm 20 include a similar portion 21. It is to be understood that the actual configuration of the bridge 16 and temple arm 20 and corresponding surfaces 18 and 22 may be changed without departing form the spirit of the present invention.

In accordance with the embodiment of FIGS. 6a and 6b, the radiation absorbing dye 25 may be interposed as a layer on either the rimless support structure 16, 20 or the lens edge 14a and 14b as shown and described in the embodiment of FIGS. 4a and 4b, or may be incorporated into the respective parts as shown and described in the embodiment of FIGS. 5a and 5b.

Figure 7:
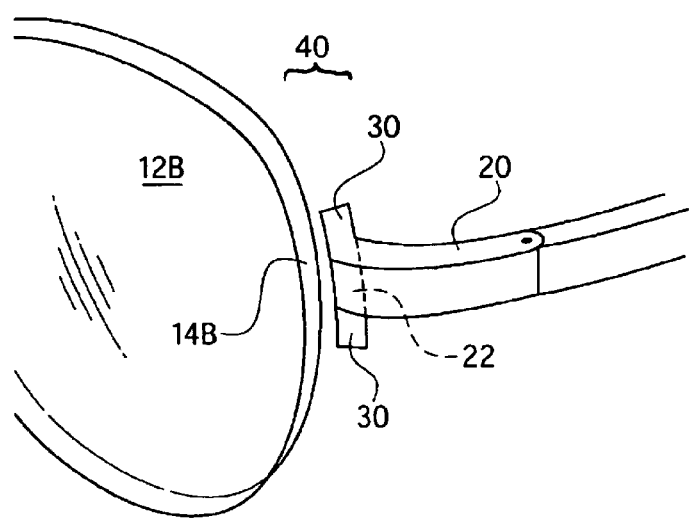
FIG. 7 is a plan view of a temple arm according to another embodiment of the invention.

FIG. 7 shows an example of a temple arm 20 according to one possible configuration. As shown, temple arm 20 includes tabs 30 that are adapted to engage the edge 14b of the lens 12b. In accordance with this embodiment, tabs 30 are preferably transmissive of the wavelengths of the radiation source used to irradiate the dye 25. Through the application of tabs 30, the radiation absorbing dye can be interposed between the two part in any one of the previously discussed embodiments, and the radiation source can irradiate the radiation absorbing dye through the transmissive tabs 30, thereby further facilitating the manufacturing process. Those of ordinary skill in the art will recognize that the configuration, placement, size or other aspects of tabs 30 may be altered without departing from the spirit of the invention. For example, the tabs may be manufactured with a profiled surface extending in the circumferential direction. In preparing the lenses at the lab, a portion of the periphery is trimmed to mate to the profiled surface. Once welded, the tab and the lens form an integral supporting assembly that substantially avoids optical interference with the lens.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for manufacturing rimless spectacles having plastic lenses and rimless supporting structures, the method comprising the steps of:

providing a connection region between a plastic lens and a rimless supporting structure, said connection region having a radiation absorbing dye having a predetermined wavelength absorbing band;

exposing the radiation absorbing dye to a source of radiation operating at a wavelength within the predetermined wavelength band of the radiation absorbing dye; and fusing the lens to the rimless supporting structure in the connection region to form an integral supporting assembly whereby optical interference from the surface of the supporting structure when viewed by the eye is substantially avoided due to its integration with the lens.

2. The method according to claim 1, wherein said step of providing further comprises coating a surface on the rimless support structure within the connection region with the radiation absorbing dye.

3. The method according to claim 1, wherein said step of providing further comprises coating a surface of the lens within the connection region with the radiation absorbing dye.

4. The method according to claim 1, wherein said step of providing further comprises incorporating the radiation absorbing dye into the lens during manufacturing of the same.

5. The method according to claim 1, wherein said step of providing further comprises incorporating the radiation absorbing dye into the rimless support structure during manufacturing of the same.

6. The method according to claim 1, wherein the connection region comprises areas on the edges of the lens and rimless supporting structures that are in contact with each other during the step of exposing.

7. A method for assembling an optically transparent, rimless supporting tab onto an ophthalmic lens comprising the steps of:

providing a thermoplastic supporting tab with a profiled surface extending in a circumferential direction and coating the surface with a radiation absorbing dye that is substantially transparent in visible light following irradiation;

trimming a plastic ophthalmic lens to form a periphery for mating to said coated profiled surface; and assembling the tab onto the periphery and irradiating the dye within the dye's absorption band through the tab or lens to fuse the tab onto the ophthalmic lens thereby forming an integral optical supporting assembly that substantially avoids optical interference with the ophthalmic lens.

8. The method according to claim 7, wherein upon irradiation the dye converts absorbed radiation into localized heat via vibrational relaxation.

9. The method of claim 8, wherein said radiation absorbing dye is selected from the group consisting of a near infrared absorbing dye and an infrared absorbing dye, and wherein the dye highly transmits all wavelengths in the visible spectrum.

10. The method according to claim 8, wherein said radiation absorbing dye is a narrow band visible light absorbing dye that highly transmits all wavelengths outside the narrow band.

11. The method according to claim 10, wherein said dye decomposes into substantially invisible by-products following irradiation.

12. The method of claim 1, further comprising the steps of:

providing on said rimless supporting structures at least one transparent, thermoplastic supporting tab with a profiled surface and coating said surface with the radiation absorbing dye;

trimming the lens to form a periphery for mating to said coated profiled surface; and assembling the tab onto the periphery and irradiating the dye within the dye's absorption band through at least one of the tab or lens to fuse the tab onto the lens.

13. A method for manufacturing rimless spectacles having plastic lenses and rimless supporting structures, the method comprising the steps of:

providing a connection region between the edge of each lens and the rimless supporting structure, said connection region having a radiation absorbing dye having a predetermined wavelength absorbing band;

joining the rimless supporting structure with an edge of the lens in an abutting relation; and irradiating the dye within the dye's absorbing band thereby fusing the lens and rimless supporting structure together at the point of contact to form an integral rimless spectacle assembly whereby optical interference from a surface of the supporting structure when viewed by the eye is substantially avoided due to its integration with the lens.

14. The method according to claim 13, wherein said step of fusing further comprises the step of exposing the radiation absorbing dye to a source of radiation operating at a wavelength within the predetermined wavelength band of the radiation absorbing dye.

15. The method according to claim 13, wherein said step of providing further comprises coating a surface on the rimless support structure within the connection region with the radiation absorbing dye.

16. The method according to claim 13, wherein said step of providing further comprises coating a surface of the lens edge within the connection region with the radiation absorbing dye.

17. The method according to claim 13, wherein said step of providing further comprises incorporating the radiation absorbing dye into the lens during manufacturing of the same.

18. The method according to claim 13, wherein said step of providing further comprises incorporating the radiation absorbing dye into the rimless support structure during manufacturing of the same.

19. The method according to claim 13, wherein the connection region comprises areas on the edges of the lens and rimless supporting structures that are in contact with each other during the step of fusing.

20. The method of claim 13, further comprising the steps of:

providing on said rimless supporting structures at least one transparent, thermoplastic supporting tab with a profiled surface and coating said surface with the radiation absorbing dye;

trimming the lens to form a periphery for mating to said coated profiled surface; and assembling the tab onto the periphery and irradiating the dye within the dye's absorption band through at least one of the tab or lens to fuse the tab onto the lens.

* * * * *